Oct. 24, 1961  E. E. HETTEEN  3,005,637
STRAW CUTTERS AND SPREADERS
Filed Sept. 8, 1958  2 Sheets-Sheet 1
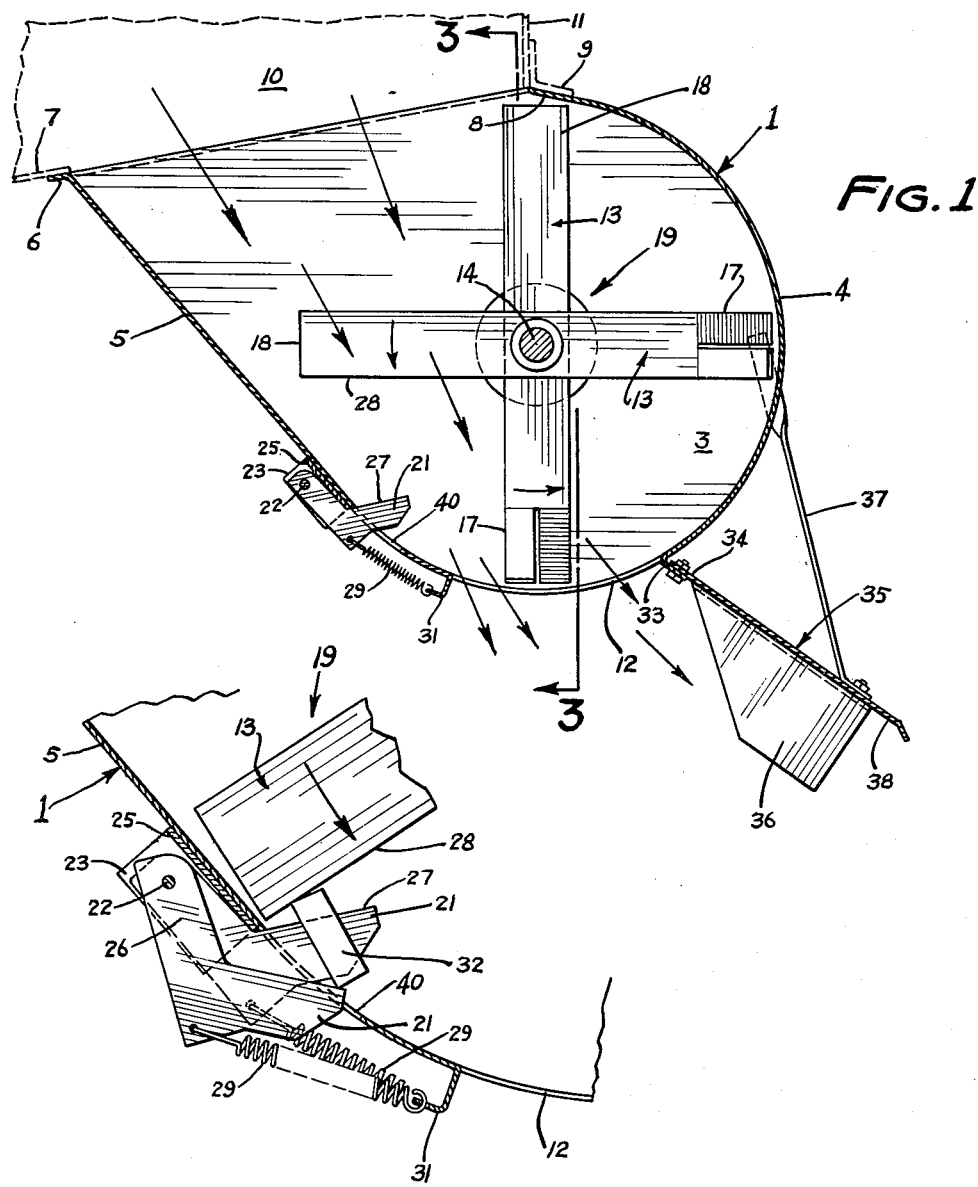
INVENTOR.
EDGAR E. HETTEEN
BY
ATTORNEYS INVENTOR.
EDGAR E. HETTEEN
BY Moore, White & Burd
ATTORNEYS United States Patent Office 3,005,637
Patented Oct. 24, 1961

3,005,637
STRAW CUTTERS AND SPREADERS
Edgar E. Hetteen, Roseau, Minn., assignor to Polaris Industries, Inc., Roseau, Minn., a corporation of Minnesota
Filed Sept. 8, 1958, Ser. No. 759,664
8 Claims. (Cl. 275—3)

This invention relates to new and useful improvements in straw cutters and spreaders for combines, and the like, such as shown in my pending application Serial No. 456,942, filed September 20, 1954, now Patent No. 2,865,416, issued December 23, 1958.

Straw cutters and spreaders of the general type herein disclosed usually comprise a set of so-called "fixed" cutting elements, and a plurality of rotatable cutter bars, which pass between the fixed cutting elements and cooperate therewith to disintegrate the straw or other material delivered into the housing of the cutter and spreader.

A straw cutter and spreader, when used in conjunction with a combine, may frequently be subjected to extremely heavy loads as, for example, when the combine is cutting damp or wet grain or material which may tend to adhere together in clumps while passing through the combine, and is delivered into the cutter and spreader in such condition, thereby subjecting the cutting means of the cutter and spreader to severe strains, and sometimes clogging of the entire apparatus.

Attempts have heretofore been made to provide means in a straw cutter and spreader for minimizing such clogging of the apparatus, when operating under certain conditions. Such attempts have consisted in mounting the fixed cutting elements whereby they may yield as a unit, when a heavy clump of material impinges thereagainst, thus permitting the material to pass uninterruptedly through the cutter and spreader, as may be understood.

The present invention distinguishes from such apparatus, in that it provides means whereby each of the so-called "fixed" cutting elements are movable independently of one another, whereby one or more cutter elements may yield at a time depending upon the size of the clump of material passing through the apparatus.

An important object of the present invention, therefore, is to provide in a straw cutter and spreader of the general type herein disclosed, a plurality of cutting elements which are preferably located in the lower portion of the cutter and spreader housing, and are normally retained in relatively fixed position to obtain maximum cutting and disintegrating action of the material delivered into the device, but which may yield when engaged by an overload.

A further object is to mount each so-called fixed cutting element whereby when engaged by a heavy clump of material, said cutting element may yield independently of adjacent cutting elements to permit such clump of material to pass through the machine without interfering with the operations of the remaining cutting elements.

Other objects of the invention reside in the pivotal mounting and arrangement of the fixed cutting elements in the lower portion of the housing, whereby they are yieldable independently of one another, and if one should become damaged from an overload and many require replacing, the damaged cutting element may readily be detached and a new one substituted therefor, without disturbing the mounting of adjacent cutting elements; in the arrangement and construction of the rotatable cutter bars which are secured to a common supporting shaft having means for driving it from a suitable drive element of the combine; each cutter bar having a bifurcated terminal and a straight terminal; and the cutter bars being alternately disposed on their supporting shaft in axially spaced relation along the length thereof; said cutter bars also being disposed at an angle to one another to provide maximum disintegrating action; in the means provided for laterally spreading the integrated material over the surface of the ground; and in the location of the straw-receiving opening in the upper portion of the housing whereby the straw is precipitated into said housing directly into engagement with the rapidly rotating blades in the housing, said blades forcibly driving the straw out into cutting and disintegrating action with the so-called fixed cutter blades 21, whereby the straw is thoroughly disintegrated and discharged from the housing onto the ground through the discharge opening 12, as indicated by the arrows in FIGURE 1.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact feaures shown, as various changes may be made within the scope of the claims which follow.

In the drawings:

FIGURE 1 is a sectional elevation on the line 1—1 of FIGURE 3, showing my improved cutter and spreader attached to the rear end of a combine; and also showing the so-called "fixed" cutting elements mounted in the lower portion of the housing and disposed in their normal operative positions, in cutting relation to the rotary cutter bars;

FIGURE 2 is an enlarged detail sectional view showing an obstruction engaged between one of the rotary cutter bars and a normally stationary yieldable cutting element located in the bottom of the housing, the yieldable cutting element being shown depressed to permit the obstruction to pass through the apparatus without damaging it;

Figure 3:
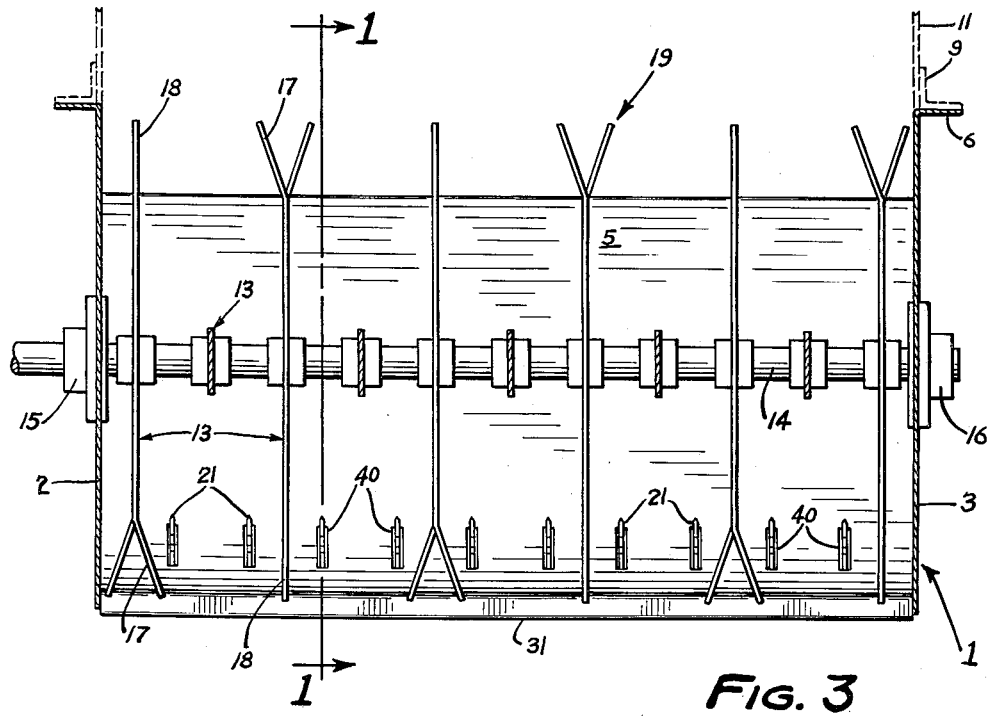
Figure 4:
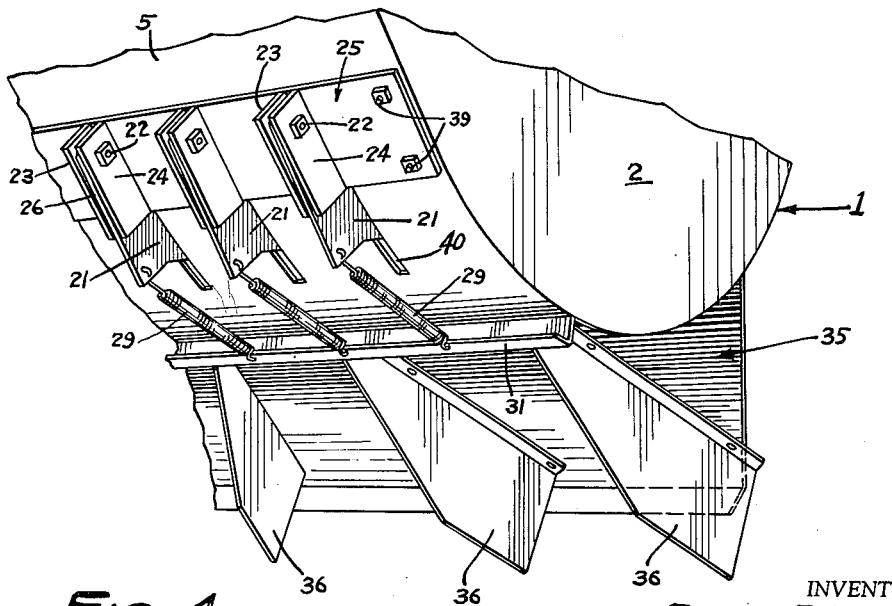

FIGURE 3 is a sectional elevation on the line 3—3 of FIGURE 1, looking into the cutter and spreader housing wherein the fixed cutter elements and rotary cutter bars are shown in their relative positions; and FIGURE 4 is a fragmentary perspective view showing the independent mounting of the so-called "fixed" cutting elements in the bottom of the cutter and spreader housing, and the springs provided for each cutting element to retain them in their normal operative or retracted positions.

The straw cutter and spreader herein disclosed comprises a housing, generally indicated by the numeral 1, shown comprising end walls 2 and 3, a semi-cylindrical rear wall 4 terminates at its lower end in a forwardly and upwardly inclined wall 5, which may be provided with a terminal flange 6 to facilitate securing it to the rear end of a conventional combine, partially indicated by the broken lines 7 in FIGURE 1. The upper marginal edge portion 8 of the semi-cylindrical rear wall 4 may be secured to an angle iron 9, which may constitute a portion of the combine and is shown forming the bottom edge of the rear wall 11 of the combine.

The cutter and spreader housing is shown having a discharge opening 12 at its bottom through which the disintegrated material is discharged by the action of the rotary cutter bars 13 secured to the shaft 14 within the housing, as clearly illustrated in FIGURES 1 and 3. The shaft is shown mounted in suitable bearings 15 and 16 secured to the end walls 2 and 3, respectively, as best shown in FIGURE 3.

To obtain maximum disintegrating action, each rotary cutter bar is shown having a bifurcated terminal 17, and a straight terminal 18. The cutter bars 13 are preferably disposed in right angular relation to one another along the length of the composite cutter rotor, generally designated by the numeral 19. The forked or bifurcated terminals 17 of the rotary cutter bars 13 are alternately disposed along the length of the rotor, and are uniformly spaced apart the width of the housing. Two so-called "fixed" cutter elements 21 are located between adjacently disposed rotary cutter bars 13, as best illustrated in FIGURE 3.

The so-called "fixed" cutter elements 21 are best illustrated in FIGURES 2 and 4, and all are identical in form, and are pivoted on bolts 22. Each bolt 22 is supported in a pair of closely spaced plates or flanges 23 and 24, welded or otherwise fixedly secured to a supporting plate 25, whereby the portion 26 of each cutting element 21 is guidingly supported between a pair of flanges 23 and 24, as will be clearly understood by reference to FIGURES 2 and 4.

Each cutting element 21 has a cutting edge 27 which faces the leading edges 28 of the rotary cutter bars or hammers 13, as will be understood by reference to FIGURE 2. Each fixed cutting element 21 is also shown having one end of a spring 29 secured thereto, the opposite end of which is shown secured to an angle bar or rail 31 extending the width of the housing, as indicated in FIGURE 4. Thus, the cutting elements are independently retained in their normal operative positions within the housing, as indicated in FIGURE 1. The springs are stiff enough to retain the cutting elements 21 in their operative position during normal operation of the cutter and spreader. Should an obstruction or oversize clump of material enter the cutter and spreader and be driven against one of the cutting elements 21, as indicated at 32 in FIGURE 2, said cutting element 21 may yield and recede to a position substantially exterior of the housing wall, thereby permitting the obstruction to pass unobstructedly through the housing and out through the discharge opening 12 located directly below the yieldable cutter elements 21.

Fixed to the rear marginal edge of the discharge opening 12 of the housing 1 is a rearwardly extending flange 33 which may extend the width of the housing, and provides an anchor for the forward edge portion 34 of an inclined deflector plate 35. A plurality of vanes or baffles 36 are secured to the underside of the deflector plate 35 and may be angularly disposed as shown in FIGURE 4, to obtain the desired spreading of the disintegrated material, when the apparatus is in operation. Braces 37 are shown having their rear ends secured to the rear portion of the deflector plate 35, and their upper ends to fixed portions of the housing, such as the end walls 2 and 3 thereof. These braces adequately support the lower end of the deflector plate 35. If desired, suitable means, not shown, may be provided for adjustably securing the upper ends of braces 37 to the end walls 2 and 3 of housing 1, thereby to make it possible to vary the angle of the plate 35, if necessary.

One of the important features of the present invention, as hereinbefore stated, resides in the yieldable mounting of the cutting elements 21, whereby they may readily yield to abnormal loads or pressure from foreign objects passing through the machine, thereby to eliminate or minimize damage to the working parts of the apparatus.

Each cutting element 21 is mounted for independent operation, whereby if only a single cutting element is engaged by an obstruction or abnormal load, that cutting element only will yield. On the other hand, if the overload is of substantial width, then several cutting elements may yield to permit passage of the material through the apparatus without causing clogging of the material, as will be understood.

Another feature of the invention resides in the construction and arrangement of the rotatable cutter bars 13. These bars are preferably arranged as shown in FIGURES 1 and 3, and are of such length that their opposed terminals pass between the yieldably mounted cutter elements 21, as shown in FIGURE 3.

The alternate arrangement of the rotatable cutting elements or beaters 13 is important, in that it tends to keep the cutting elements clean and free from foreign matter regardless of the condition of the straw being processed. The independently movable cutter blades 21 are normally positioned within the housing, and are freely movable through the slots 40, when engaged by a heavy wad or clum of straw.

By mounting the movable cutter blades as shown in FIGURES 1, 2 and 3, all operating mechanism for said blades is mounted exteriorly of the straw chamber, as clearly indicated in FIGURE 3, whereby the incoming straw may be driven forcibly into engagement with the blades 21 by the action of the rotary blades 13, thereby resulting in more thorough and complete disintegration of the straw or material delivered into the cutter housing, and with the assurance that all such distintegrated material will be uniformly distributed over the ground surface.

The machine has been found to operate very efficiently when the rotatable cutter bars are spaced on the shaft 14, as shown in FIGURE 3. When so mounted, their terminals pass between alternate pairs of cutter elements 21. Obviously, they may be otherwise spaced with respect to the cutter elements 21 without departing from the scope of the invention.

With further reference to the movable cutter elements 21, to facilitate manufacture and assembly thereof, the cutter elements 21 may be mounted upon a common supporting plate 25 which in turn, may be removably secured to the front wall 5 of the housing 1 of the cutter and spreader by suitable bolts 39. By so mounting the cutting elements 21, all of said elements may be simultaneously detached from the housing 1 by removal of the bolts 39, or they may be independently detached from the housing by removal of the pivot bolts 22. A plurality of spaced parallel slots 40 are provided in the lower portion of the upwardly inclined front wall 5 to receive the cutting elements 21.

The invention may be embodied in other specific forms without departing from the essential characteristics thereof. Hence, the present embodiments are therefore to be considered in all respects merely as being illustrative, and not as being restrictive, the scope of the invention being indicated by the appended claims rather than by the foregoing description, and all modifications and variations as fall within the meaning and purview and range of equivalency of the appended claims are therefore intended to be embraced therein.

I claim as my invention:

1. In an apparatus of the class described, a housing comprising a rear wall, a bottom wall, a forwardly and upwardly inclined front wall, and side walls, the upper marginal edges of the upright walls of the housing cooperating to define a receiving opening, said front wall having a plurality of spaced vertical slits therein, means on said walls for securing the housing to a combine with its receiving opening in communication with the usual discharge opening of the combine, a shaft extending lengthwise through said housing and having its end portions rotatably supported in bearings secured to said side walls, a plurality of cutter bars secured to said shaft in axially spaced relation for direct rotation therewith, said housing having a discharge opening in its bottom wall, a plurality of cutting elements, means for pivotally supporting said cutting elements on said front wall exteriorly thereof and with their swingable end portions extending through said slits into cutting relation to said rotatable cutter bars, and means connected to the swingable end of each cutting element and to fixed means on the housing for normally retaining the swingable end portions of the cutter elements in cutting relation to the rotary cutter bars, but permitting said cutting elements to yield independently of one another when an overload is delivered into the housing from the combine, whereby said cutting elements when engaged by said overload, may retract and permit the overload to pass uninterruptedly through the housing and its discharge opening without causing damage to the operating parts of the apparatus.

2. An apparatus according to claim 1 wherein each cutting element has a spring attached thereto for normally retaining said cutting element in extended operative positions within the housing, whereby one or all of said cutting elements may retract when subjected to an abnormal pressure by the material delivered into the housing.

3. An apparatus according to claim 2 wherein said cutting elements are removably mounted on a common support to facilitate manufacture and assembly.

4. In an apparatus of the class described a housing comprising a semi-cylindrical rear wall, a bottom wall, a forwardly and upwardly extending front wall, and side walls, the upper marginal edge portions of said rear, front and side walls cooperating to define a receiving opening for the housing, means for securing the housing to a combine with its receiving opening in communication with the usual straw discharge opening of the combine, whereby all straw and other rough material discharging from the combine must pass through said housing, a shaft extending lengthwise through the housing, a plurality of cutter bars secured to said shaft in axially spaced relation for direct rotation therewith, a plurality of cutting elements mounted for pivotal movement on a lower wall portion of said housing, and normally having their swingable ends extending into the housing in cutting relation to said rotatable cutter bars, and means interposed between the swingable ends of said pivoted cutting elements and a fixed portion of the housing for independently yieldably retaining said cutting elements in cutting relation to said rotatable cutter bars under normal operating conditions, but permitting one or more of said cutting elements to yield to abnormal pressure of the material thereagainst, whereby a relatively large compact clump of material delivered into the housing may pass uninterruptedly through the housing without causing damage to the cutting elements.

5. In an apparatus according to claim 4, wherein said rotatable cutter bars are angularly disposed to one another along the length of the shaft, and each has a bifurcated terminal and a plain terminal adapted to engage and drive the straw and other roughage delivered into the housing into cutting and disintegrating engagement with said yieldable cutting elements, and said housing having a discharge opening in its bottom wall through which the disintegrated material may be discharged onto the ground.

6. In an apparatus of the class described a housing comprising a semi-cylindrical rear wall, a bottom wall, a forwardly and upwardly extending front wall, and side walls, the upper marginal edge portions of said rear, front and side walls cooperating to define a receiving opening for the housing and having means for securing the housing to a combine with its receiving opening in communication with the usual straw discharge opening of the combine, whereby all straw and other rough material discharging from the combine must pass through said housing, a shaft extending lengthwise through the housing, a plurality of cutter bars secured to said shaft in axially spaced relation for direct rotation therewith, a plurality of cutting elements mounted for pivotal movement on a lower wall portion of said housing, said cutting elements being L-shaped in configuration and having their L-shaped end portions extending into the housing in cutting relation to said rotatable cutter bars, and means interposed between the swingable ends of said pivoted cutting elements and a fixed portion of the housing for independently yieldably retaining said cutting elements in cutting relation to said rotatable cutter bars under normal operating conditions, but permitting one or more of said cutting elements to yield to abnormal pressure of the material thereagainst, whereby a relatively large compact clump of material delivered into the housing may pass uninterruptedly through the housing without causing damage to the cutting elements.

7. In a straw cutter of the class described comprising a rear, bottom, front and side walls, said housing having a receiving opening at its upper end and a discharge opening at its bottom, means for securing the housing to a combine with its receiving opening in communication with the straw discharge opening of the combine whereby all straw discharged from the combine must pass through said housing, a shaft extending lengthwise through the housing transversely thereof, a plurality of cutter bars secured to said shaft in axially spaced relation and extending radially therefrom, a plurality of retractable cutting elements pivotally mounted on a lower wall portion of the housing exteriorly thereof and each having an end portion extending through openings in the wall of the housing and into cutting relation to the terminal portions of the rotatable cutter bars secured to said shaft, and each cutting element having a spring normally retaining it in inwardly extending cutting relation to said cutter bars to effect thorough and complete disintegration of the material delivered into the housing from the combine, but in the event of an abnormal mass of material being dumped into the housing from the combine and momentarily imposing an overload on one or more of said pivoted cutting elements, said overloaded cutting elements may yield independently of one another and retract to a position to permit the abnormal mass of material to pass unobstructedly through the housing.

8. In a straw cutter and spreader according to claim 7 wherein each pivoted retractable cutting element is guidingly supported between a pair of spaced guide plates fixed to the exterior of the housing wall.

References Cited in the file of this patent

UNITED STATES PATENTS

| | | |
|---|---|---|
| 431,612 | McKillen | July 8, 1890 |
| 1,211,566 | Fortney | Jan. 9, 1917 |
| 1,840,749 | Stresau | Jan. 12, 1932 |
| 2,465,488 | Sears et al. | Mar. 29, 1949 |
| 2,619,294 | Mullner | Nov. 25, 1952 |
| 2,670,775 | Elofson | Mar. 2, 1954 |
| 2,700,996 | Smith | Feb. 1, 1955 |
| 2,708,582 | Adams | May 17, 1955 |
| 2,842,175 | Thompson | July 8, 1958 |
| 2,865,416 | Hetteen | Dec. 23, 1958 |